May 22, 1951  F. E. BURGER  2,554,008
PROCESS OF MANUFACTURE OF COMPOSITE BEARINGS
AND OTHER COMPOSITE MACHINE PARTS
Filed Sept. 19, 1945  4 Sheets-Sheet 1
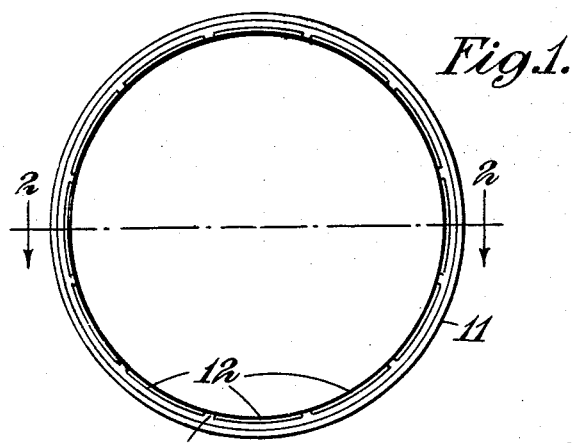
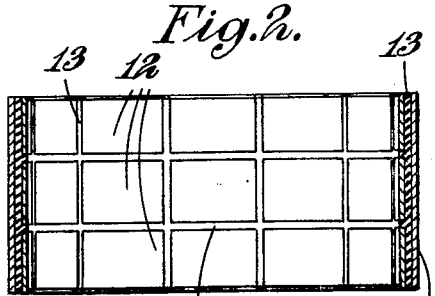
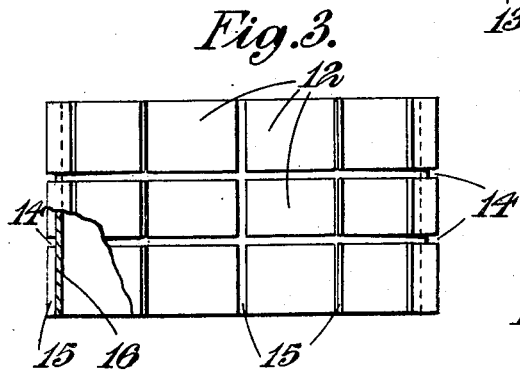
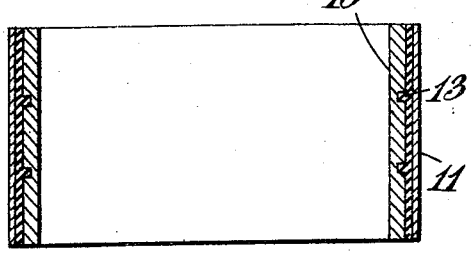
INVENTOR
Frank E. Burger
By Watson, Cole, Grindle & Watson

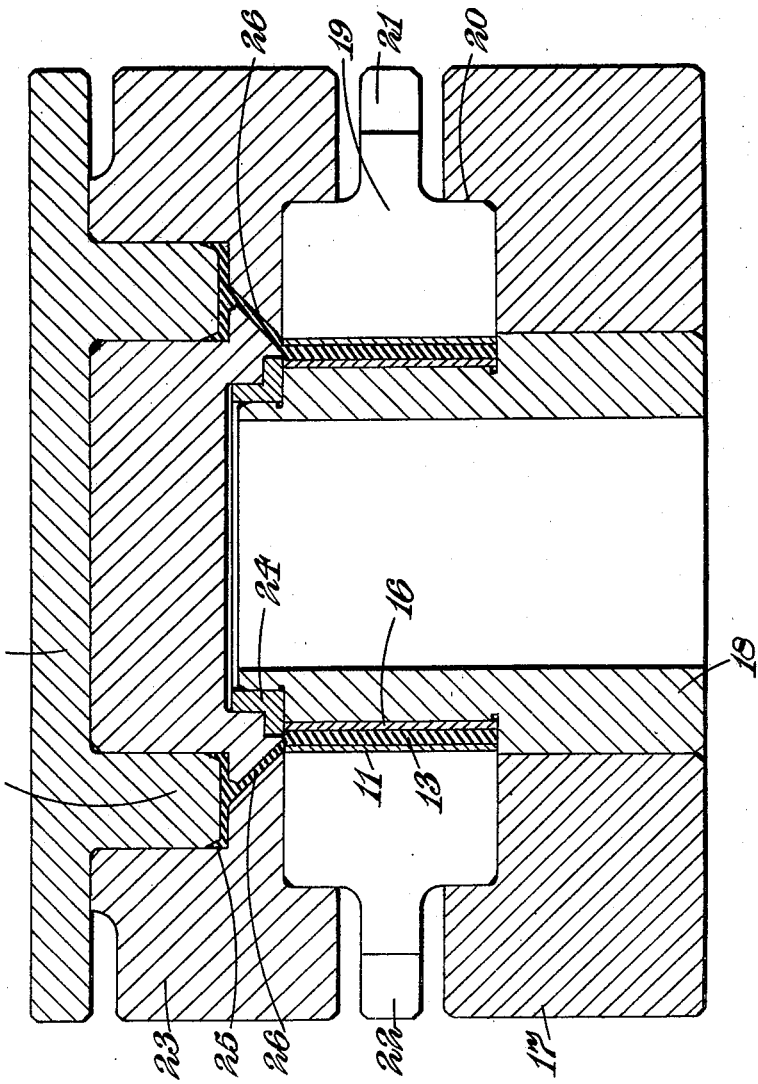

May 22, 1951   F. E. BURGER   2,554,008
PROCESS OF MANUFACTURE OF COMPOSITE BEARINGS
AND OTHER COMPOSITE MACHINE PARTS
Filed Sept. 19, 1945   4 Sheets-Sheet 3
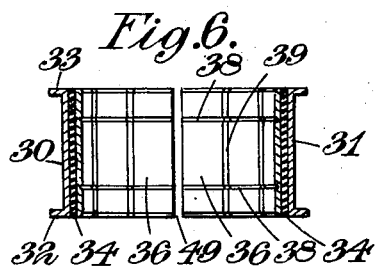
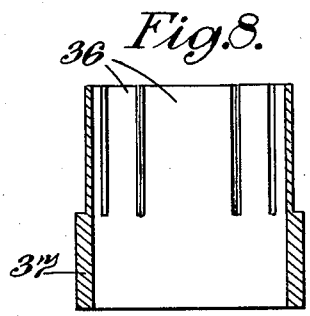
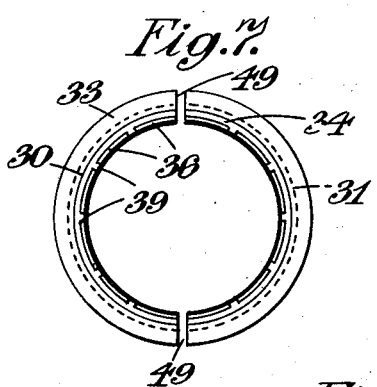
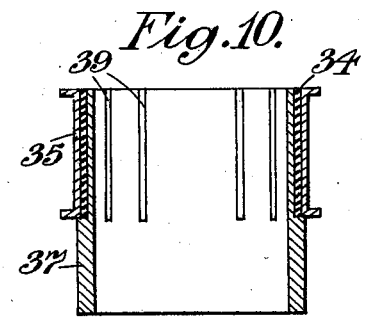
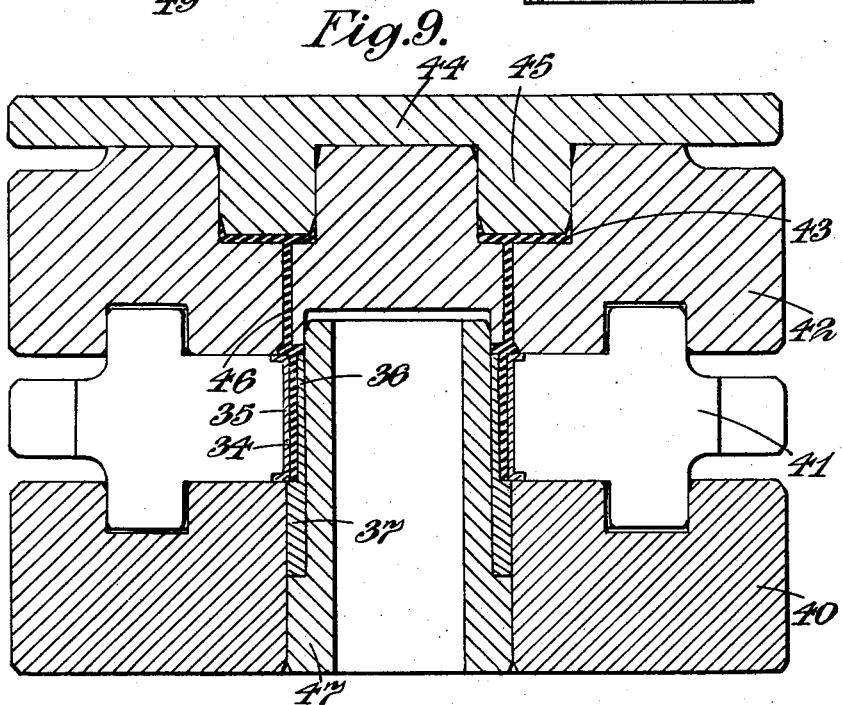
INVENTOR
Frank E. Burger
By Watson, Cole, Grindle
& Watson

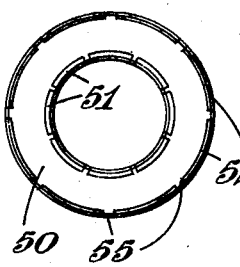
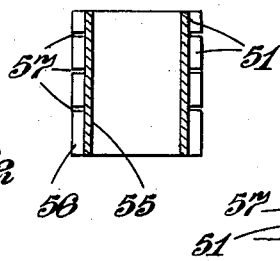
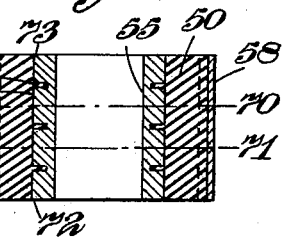
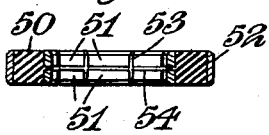
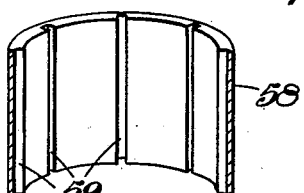
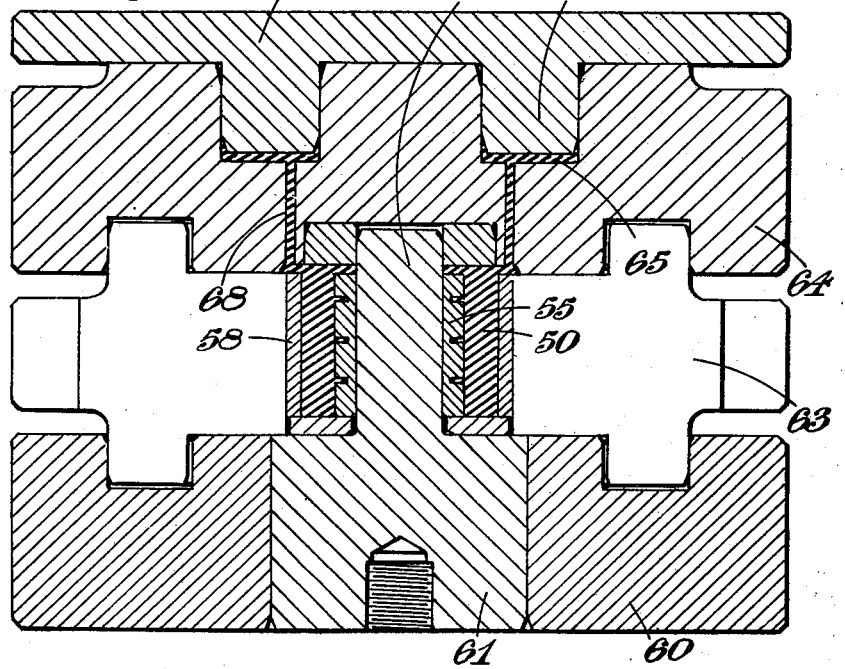

Patented May 22, 1951

2,554,008

UNITED STATES PATENT OFFICE 2,554,008

PROCESS OF MANUFACTURE OF COMPOSITE BEARINGS AND OTHER COMPOSITE MACHINE PARTS

Frank Edward Burger, Warren Row, near Reading, England, assignor to Jaru Limited, London, England, a British company Application September 19, 1945, Serial No. 617,297
In Great Britain September 29, 1944

3 Claims. (Cl. 29—149.5)

This invention comprises improvements in or relating to processes of manufacture of composite bearings and other composite machine-parts.

In United States Patent Specification No. 571,045 there is described a composite bearing in which a number of separate bearing surface elements are assembled close together in or on a supporting body of resilient material which serves to support the elements and space them from each other, thereby enabling them to yield so as to substantially conform to changes of shape or size of the mechanical part with which the bearing co-operates. The present invention relates to a method of manufacture of such bearings and of other composite machine-parts, such for example as oil seals, composite sleeves for muff couplings and the like. In all these cases a number of separate elements are arranged to be supported close together on a supporting body of resilient material which constitutes the means whereby the elements are maintained in position and by which stresses are transmitted to other parts of the apparatus in connection with which the bearing or like machine-part is employed.

According to the present invention a method of manufacture of composite bearings or other composite machine-parts of the kind described, consists in first forming the elements of the machine-part, which are to be supported on the resilient material, with extensions which may act as temporary holding means, mechanically holding them in relation to one another by means of the temporary holding means in the position which they are intended to occupy in the finished machine-part, while they are so held forcing mouldable resilient material in plastic condition into contact with the elements, maintaining the whole under heat and pressure until the mouldable resilient material has become bonded to the elements and thereafter machining away the temporary holding means.

Conveniently the temporary holding means are provided by initially forming the elements as part of a single member which comprises the holding means and the elements, and after the bonding operation the temporary holding means is machined away so as to separate the elements from one another.

The following is a description by way of example of certain specific instances of the manufacture of machine-parts in accordance with the present invention:

In the accompanying drawings:

Figure 1 is a plan of a bearing liner;

Figure 2 is a section upon the line 2—2 of Figure 1, looking in the direction of the arrows;

Figure 3 is an outside elevation of a part which includes bearing pads for the liner shown in Figure 1;

Figure 4 is a vertical section through a mould;

Figure 5 is a longitudinal section through a bearing liner as it comes from the mould of Figure 4 and before machining to the form shown in Figures 1 and 2;

Figure 6 is a longitudinal section;

Figure 7 is a plan of a split bearing liner;

Figure 8 is a view of bearing pads in the bearing of Figures 6 and 7, temporarily united together by a temporary holding portion;

Figure 9 is a longitudinal section through a mould showing the moulding operation;

Figure 10 is a longitudinal section through a completed bearing prior to removal of the temporary holding portion;

Figure 11 is a plan;

Figure 12 is a longitudinal section through an oil sealing ring;

Figure 13 is a longitudinal section through an assembly of bearing pads formed upon a temporary supporting member;

Figure 14 is a longitudinal section, partly in perspective, through an outside supporting ring, forming part of the oil seal, showing temporary holding means therefor;

Figure 15 is a longitudinal section through a mould, and

Figure 16 shows a manufactured part comprising a number of oil sealing rings after ejection from the mould and prior to parting off to produce the oil sealing ring of Figures 11 and 12.

Referring to Figures 1 and 2, these show a bearing liner which consists of a flexible outer steel ring 11 and a number of separate Phosphor bronze bearing pads 12 which are located within the ring 11 and are spaced therefrom, and from one another, by a supporting body of resilient synthetic rubber 13. The problem which arises in manufacture of such a bearing is how to support the separate bearing pads 12 so that they are correctly spaced from one another and from the outer ring 11 during the operation of bonding them to the rubber supporting body 13. This problem can of course be solved by conventional methods of providing a fixture in which there are means for gripping each individual pad and holding it in place but owing to the number of the pads such an arrangement is complicated and it is an object of the invention to provide a method of manufacture which is relatively simple.

According to the invention the pads 12 are formed as part of a structure shown in Figure 3 which consists of a phosphor bronze tube 16 the outside diameter of which is such as to correspond to the outer curve of the pads shown in Figures 1 and 2. The tube is machined circumferentially with grooves 14 and longitudinally with grooves 15 which sub-divide its outer surface into rectangles corresponding with the pads. The grooves are at least as deep as the thickness of the pads but not deep enough to cut through the thickness of the tube 16, the internal diameter of which is smaller than the internal diameter of the finished liner shown in Figures 1 and 2. The internal portion of the tube acts as temporary holding means for supporting the pads 12 in their correct relation to one another during subsequent operations.

The ring 11, which may be machined so that its external diameter is slightly oversize, and the part shown in Figure 3 which comprises the pads 12 and the temporary holding means constituted by the inner portion of the tube 16, are now taken and introduced, concentrically with one another, into a mould which is shown in Figure 4. The mould comprises a ring-shaped bottom plate 17 and a core 18 which fits a hole in the centre of the bottom plate. The core 18 is machined to fit the internal diameter of the tube 16. Around the supporting ring 11 is the body of the mould which consists of two semi-circular halves 19 which are split diametrically. The outside of these halves fits into the bottom plate 17 as shown at 20 and they are notched out as shown at 21, 22 in their outer circumferences at the place where they meet one another so that when the mould is disassembled and the half portions 19 of the body are to be taken apart from one another, a tool can be inserted into the recesses 21, 22 to prise them apart if necessary. A ring-shaped feeder plate 23 fits over the top of the body members 19. A packing ring 24 is interposed between the feeder plate 23 and the upper edge of the core member 18. A large annular groove 25 is machined in the upper part of a feeder plate 23 and this groove is connected by a number of ducts 26 with the space between the tube 16 and the supporting ring 11. An annular piston 27 is formed on a top plate 28 and the piston 27 fits into the annular groove 25. The groove 25 constitutes a feeder cup and an uncured mix of synthetic rubber is placed in this groove before the feeder plate is laid in place.

The whole is then introduced between the platens of a steam-heated hydraulic press, the platens of which are heated with steam at 60 pounds pressure. When the parts become hot by contact with the platens hydraulic pressure is applied to force the annular piston 27 into the feeder cup 25 and the rubber mix is forced through the ducts 26 into the space between the Phosphor bronze tube 16 and the outer steel supporting ring 11. The parts are left in this position, receiving heat from the platens, until the mix is cured, which with a suitable mix may take half an hour. Thereafter the mould is removed from the press and taken apart, the bearing comprising the supporting ring 11, the rubber body 13 and the inner tube 16 being removed intact. In this condition it bears the appearance shown in Figure 5 and is mounted in a lathe and the interior of the tube 16 is machined out until the temporary supporting metal constituted by the interior of the tube is removed and the supporting pads are freed from one another and remain embedded in the body of synthetic rubber 13 as shown in Figures 1 and 2. The ends being machined smooth and the exterior of the ring 11 machined concentric with the interior of the bearing, the steps of the method according to the invention are completed.

Referring now to Figures 6 to 10, these show the manufacture of a split bearing such as might be employed for the big end of a connecting rod in an internal-combustion engine. The completed bearing is shown in Figures 6 and 7 and comprises a flanged outer supporting ring divided into two parts 30, 31 and provided with flanges 32, 33. Within the ring 30, 31 and bonded thereto is a supporting body of vulcanised synthetic rubber 34 in which are embedded and supported a number of separate Phosphor bronze bearing pads 36. These are separated from one another by longitudinal spaces 39 which are filled with rubber. The bearing pads 36 are each divided into three sections, the division being effected by circumferentially extending oil retaining grooves 38, turned in the face of the bearing pads but not deep enough to cut through the metal.

In order to manufacture this bearing the pads 36 are first formed by turning the end of a sleeve 37, shown in Figure 8 and then slitting the turned portion to separate the pads from one another. They remain, however, supported in their correct relation to one another by their connection at one end to the unturned portion of the sleeve 37, which acts as a temporary holding means. The outer supporting ring 30, 31 is turned to shape but in a single piece which is shown as the piece 35 in Figures 9 and 10. The ring 35 and the holding means 37 with the pads 36 attached to it are assembled in a sectional mould shown in Figure 9 and consisting of a ring-shaped bottom plate 40, a split body 41 similar to the body 19 already described in connection with Figure 4, an upper ring 42 comprising a feeder cup 43 and a top plate 44 having an annular piston 45 to fit the feeder cup. The feeder cup is connected by ducts 46 with the space between the ring 35 and the pads 36 and when the mould is being assembled uncured rubber mix is placed in the feeder cup 43. The temporary holding member 37 and pads 36 are supported in their proper relation with the mould by a core 47 which fits the interior of the ring-shaped bottom plate 40 and extends upwards through the body 41 into engagement with the upper ring 42 which contains the feeder cup.

Thus assembled the mould is inserted in a heated hydraulic press, the rubber is forced into the spaces between the parts of the bearing and the whole bonded together and the rubber cured in situ as already described in connection with Figure 4.

Thereafter the mould is taken apart and the bearing appears as shown in Figure 10. The tubular temporary holding means is mounted in a chuck, the bearing turned internally and externally and parted off from the temporary holding means. Thereafter it is sawn into two portions so that it appears in the completed form as shown in Figures 6 and 7. In making the pads 36, as shown in Figure 8, it is not necessary to slit apart the two pads which occupy the place where the slit 49 appears which divides the bearing into two, because these pads are automatically divided from one another in the final operation of sawing the bearing into two parts.

Referring now to Figures 11 to 16, there is shown in Figures 11 and 12 an oil sealing ring. This comprises a rubber supporting body 50 in the form of a ring which supports a number of internal bearing pads 51 and is supported by an external steel series of segments 52 which constitute an outer ring. The bearing pads 51 are sub-divided from one another by rubber-filled spaces 53 and there are two rows of the pads 51 which are sub-divided by a rubber-filled circumferentially extending space 54. The spaces between the outer steel segments 52 are also filled with rubber as shown at 55, Figure 11. The rubber and the metal parts are bonded together and the whole forms a flexible sealing ring which is capable of preventing the leakage of oil along a shaft from a bearing. The substantial radial depth of the rubber ring 50 makes the segments 51 able to adapt themselves to any slight lack of roundness in the shaft which passes through them and also ensures that the sealing ring does not bear any substantial part of the load which comes on the bearing with which it is associated. Such sealing rings are manufactured according to the present invention by first making a sleeve-like assembly which comprises a number of the rings in one piece and then parting them off from one another.

Figure 13 of the drawings shows a tubular member 55 which acts as a temporary holding means for the pads 51. The pads are formed on the tubular holding member by taking tubular stock of sufficient dimensions and machining slots 56 along it lengthwise and circumferential slots 57 crossing the slots 56. It is to be noted that the circumferential slots 57 correspond in width to the circumferential division 54 between the pads 51, as shown in Figure 12. The first slot 57 is made at a distance from the end of the tubular member 55 which is half of the distance from the next slot 57 for a reason which will presently appear. For the outer steel segments 52 a tube is taken of a length equal to the tubular member 55 of Figure 13 and of an internal diameter equal to the internal distance between the segments 52 measured diametrically across the oil seal Figure 11. This sleeve is shown in Figure 14 at 58; it is grooved internally as shown at 59 to correspond with the spaces 55 between the segments 52 and thus the segments are formed but are left attached to the exterior of the tube 58 which constitutes a temporary holding means.

The parts are introduced into a mould shown in Figure 15 comprising a ring-shaped bottom plate 60; a core member 61 fitting into the bottom plate and having a plug portion 62 which fits the interior of the tubular member 55; a split body portion 63; and upper ring-shaped portion 64 containing a feeder cup 65, and a top plate 66 having an annular piston 67 to fit the feeder cup. The feeder cup 65 is connected by ducts 68 to the space between the tubular members 55, 58 and rubber from the feeder cup is forced under heat and pressure as already described into this space and thereby vulcanised and bonded to the parts. The result, when the mould has been taken apart, is a composite tubular assembly comprising the outer tubular ring 58 and inner tube 55 united together by a body of rubber 50. This can be bored out internally to remove the temporary holding member 55 and leave the pads 51 supported only by the rubber 50. Similarly, machining away the outer part of the tube 58 will leave the segments 52. The member being then parted off along the chain lines 70, 71, shown in Figure 16, three oil sealing rings such as are shown in Figures 11 and 12 are produced. It will be appreciated that the dimensions of the parts need to be chosen so as to allow for the width of the parting off tool and that the end faces 72, 73 are also machined away to give a smooth finish and to make the dimensions exact.

In cases where it is not possible to form the bearing surface elements as an integral part of a single member which is subsequently machined away, it is possible to provide the elements with extensions which are supported in a holder and to machine away the extensions after the moulding process.

The invention is not limited to the manufacture of cylindrical bearings or other cylindrical machine-parts of the kind described, as obviously conical bearings or thrust-washers or the like could be similarly manufactured.

It will further be understood that grooves in tubular elements, such as the grooves 14 and 15 of Figure 3, or the grooves 59 of Figure 14, need not necessarily extend in a rectangular pattern with the lines parallel to or at right angles to the axis of the tubular member as they could be machined in any other pattern, for example a diamond pattern, if desired, according to the desired shape of the bearing pads or supporting elements which are to be produced in the finished article. Moreover in the case of oil seals which require to have the bearing surface elements on the outside instead of on the inside, or piston packings in which the bearing surface elements require to be on the outside or in other like cases, the invention is equally applicable to the manufacture, the appropriate reversal of the shape described being all that is necessary to produce the desired result.

In some cases machine parts produced as described according to the invention can be used for other purposes than bearings or oil seals, for example as bushes or elements of couplings.

I claim:

1. A method of manufacture of a composite machine part wherein a plurality of bearing elements are embedded in rubber so as to be supported thereby while being spaced and separate from each other, consisting in first forming a tube of bearing material, machining a peripheral surface of the tube with intersecting grooves to divide the surface into spaced sections corresponding to the intended bearing elements, forcing rubber under pressure in plastic condition into contact with the grooved surface, maintaining the whole under heat and pressure until the rubber has become bonded to the grooved surface to produce a unit, cooling the unit and machining away the other peripheral surface of the tube to expose the intersecting grooves and separate the bearing elements from each other.

2. A method of manufacture of a composite machine part wherein a plurality of bearing elements are embedded in rubber so as to be supported thereby while being spaced and separate from each other, consisting in first forming a tube of bearing material, forming circumferential and longitudinal grooves on the outer peripheral surface of the tube to divide the surface into spaced sections corresponding to the intended bearing elements, assembling the tube in a mould with a co-axial second tube around it and spaced from its grooved peripheral surface, forcing rubber under pressure in plastic condition between the two tubes, maintaining the whole under heat and pressure until the rubber and sleeves are bonded together as a unit, and machining the inside peripheral surface of the inner sleeve to expose the grooves and separate the bearing elements from each other.

3. A method of manufacture of composite machine parts as claimed in claim 2, including the additional step after the machining operation of parting across the unit between the circumferential grooves to produce a plurality of composite machine parts.

FRANK EDWARD BURGER.

REFERENCES CITED

The following references are of record in the file of this patent:

UNITED STATES PATENTS

| Number | Name | Date |
| --- | --- | --- |
| 1,494,099 | Cole | May 13, 1924 |
| 1,959,254 | Zerk | May 15, 1934 |
| 2,058,621 | Pike | Oct. 27, 1936 |
| 2,145,962 | Zink | Feb. 7, 1939 |
| 2,227,969 | Haushatter | Jan. 7, 1941 |
| 2,289,703 | Goerke et al. | July 14, 1942 |
| 2,305,001 | Hammer | Dec. 15, 1942 |
| 2,397,626 | Shriver, Jr. | Apr. 2, 1946 |